US012626470B1

(12) United States Patent　　　　(10) Patent No.:　US 12,626,470 B1

Nizamudeen Basha et al.　　　　(45) Date of Patent:　　May 12, 2026

(54) ARTIFICIAL REALITY ROOM CAPTURE REALIGNMENT

(71) Applicant: Meta Platforms Technologies, LLC, Menlo Park, CA (US)

(72) Inventors: Shaik Shabnam Nizamudeen Basha, London (GB); Lu Zhou, San Francisco, CA (US); Eugene Lee, Mountain View, CA (US); Kelly Rui-Ying Wang, Saratoga, CA (US); Sony Nguyen, San Jose, CA (US); Hongbing Hu, Palo Alto, CA (US); Sean Finn, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 338 days.

(21) Appl. No.: 18/346,379

(22) Filed: Jul. 3, 2023

(51) Int. Cl.
　　*G06T 19/20*　　(2011.01)
　　*G06T 17/00*　　(2006.01)
　　　　(Continued)

(52) U.S. Cl.
　　CPC .............. *G06T 19/20* (2013.01); *G06T 17/00* (2013.01); *G06T 19/006* (2013.01); *G06V 20/20* (2022.01);
　　　　(Continued)

(58) Field of Classification Search
　　CPC ....... G06T 19/20; G06T 17/00; G06T 19/006; G06T 2200/24; G06T 2219/004; G06T 2219/2004; G06V 20/20
　　See application file for complete search history.

(56) References Cited

U.S. PATENT DOCUMENTS 6,842,175 B1　　1/2005　Schmalstieg et al.
8,812,954 B2　　8/2014　Shuster et al.
　　　　(Continued)

FOREIGN PATENT DOCUMENTS

CN　　105190703 A　　12/2015
CN　　107209950 A　　9/2017
　　　　(Continued)

OTHER PUBLICATIONS

Coster; "The Effects of Shadows on Depth Perception in Augmented Reality on a Mobile Device," Degree Project in Computer Science and Engineering, Royal Institute of Technology, School of Electrical Engineering and Computer Science (EECS), Apr. 24, 2019, 16 pages.

(Continued)

*Primary Examiner* — Chong Wu

(74) *Attorney, Agent, or Firm* — Potomac Law Group, PLLC; Dannon G. Allbee

(57) ABSTRACT

Example implementations are directed to recapturing or realigning a room or scene in an artificial reality (XR) environment as a three dimensional (3D) space. To initially capture a room, a user manually annotates, using an XR system, one or more walls around the XR system. The XR system then aligns or localizes itself relative to the room. Once a room is captured and stored, and the user in the future enters the room again, the XR system may not be able to align itself in the room due to, for example, lighting conditions. Rather than require the user to manually recapture every wall captured during the initial room capture, the XR system can select one wall for recapture and, after receiving an annotation or marking of the one wall from the user, use the selection to realign the XR system relative to the room.

20 Claims, 14 Drawing Sheets

(51) Int. Cl.
  *G06T 19/00* (2011.01)
  *G06V 20/20* (2022.01)
(52) U.S. Cl.
  CPC .... *G06T 2200/24* (2013.01); *G06T 2219/004*
  (2013.01); *G06T 2219/2004* (2013.01)

(56) References Cited

U.S. PATENT DOCUMENTS

| | | | |
|---|---|---|---|
| 9,047,706 B1 | 6/2015 | Ogale |
| 9,323,325 B2 | 4/2016 | Perez et al. |
| 9,588,593 B2 | 3/2017 | Li |
| 9,761,052 B2 | 9/2017 | Groten et al. |
| 9,814,982 B2 | 11/2017 | Chuaypradit et al. |
| 9,843,772 B2 | 12/2017 | Lee et al. |
| 10,242,476 B2 | 3/2019 | Bastaldo-Tsampalis et al. |
| 10,281,981 B2 | 5/2019 | Kim et al. |
| 10,297,082 B2 | 5/2019 | Wilson et al. |
| 10,304,247 B2 | 5/2019 | King |
| 10,503,351 B2 | 12/2019 | Gullicksen |
| 10,733,800 B2 | 8/2020 | Booth et al. |
| 10,803,315 B2 | 10/2020 | Cho et al. |
| 11,106,038 B2 | 8/2021 | Roggatz |
| 11,176,748 B2 | 11/2021 | Ohashi |
| 11,227,446 B2 | 1/2022 | Malia et al. |
| 11,314,376 B2 | 4/2022 | Agarawala et al. |
| 11,666,825 B2 | 6/2023 | Delamont |
| 11,789,526 B2 | 10/2023 | Jo et al. |
| 11,829,527 B2 | 11/2023 | Kim et al. |
| 11,829,959 B1 | 11/2023 | Latif et al. |
| 11,830,148 B2 | 11/2023 | Booth et al. |
| 11,927,756 B2 | 3/2024 | Jeong et al. |
| 11,928,819 B2 | 3/2024 | Sieckmann et al. |
| 11,941,315 B2 | 3/2024 | Jeong et al. |
| 12,003,697 B2 | 6/2024 | Hong |
| 12,008,170 B2 | 6/2024 | Kim et al. |
| 12,032,728 B2 | 7/2024 | Munro et al. |
| 12,113,374 B2 | 10/2024 | Yoon et al. |
| 12,118,678 B2 | 10/2024 | Choi et al. |
| 2002/0050988 A1 | 5/2002 | Petrov et al. |
| 2002/0158873 A1 | 10/2002 | Williamson |
| 2008/0015018 A1 | 1/2008 | Mullen |
| 2008/0089577 A1 | 4/2008 | Wang |
| 2009/0251465 A1 | 10/2009 | Hassenpflug |
| 2009/0279784 A1 | 11/2009 | Arcas et al. |
| 2010/0245376 A1 | 9/2010 | Bar-Zeev et al. |
| 2010/0315412 A1 | 12/2010 | Sinha et al. |
| 2011/0230263 A1 | 9/2011 | Ng |
| 2012/0001901 A1 | 1/2012 | Park |
| 2012/0069018 A1 | 3/2012 | Yamaya et al. |
| 2012/0142415 A1 | 6/2012 | Lindsay |
| 2012/0194516 A1 | 8/2012 | Newcombe et al. |
| 2012/0249741 A1 | 10/2012 | Maciocci et al. |
| 2012/0263154 A1 | 10/2012 | Blanchflower et al. |
| 2012/0264510 A1 | 10/2012 | Wigdor et al. |
| 2013/0018952 A1 | 1/2013 | McConnell et al. |
| 2013/0083062 A1 | 4/2013 | Geisner et al. |
| 2013/0141418 A1 | 6/2013 | Edholm |
| 2013/0141428 A1 | 6/2013 | Gipson |
| 2013/0196759 A1 | 8/2013 | Kim |
| 2013/0196772 A1 | 8/2013 | Latta et al. |
| 2013/0215230 A1 | 8/2013 | Miesnieks et al. |
| 2013/0225296 A1 | 8/2013 | Kim |
| 2013/0342564 A1 | 12/2013 | Kinnebrew et al. |
| 2014/0071251 A1 | 3/2014 | Nakamura et al. |
| 2014/0218361 A1 | 8/2014 | Abe et al. |
| 2015/0015576 A1 | 1/2015 | Algreatly |
| 2015/0016777 A1 | 1/2015 | Abovitz et al. |
| 2015/0029214 A1 | 1/2015 | Kumagai |
| 2015/0154453 A1 | 6/2015 | Wilf |
| 2015/0312561 A1 | 10/2015 | Hoof et al. |
| 2015/0348511 A1 | 12/2015 | Oriol et al. |
| 2016/0012157 A1 | 1/2016 | Williams et al. |
| 2016/0026253 A1 | 1/2016 | Bradski et al. |
| 2016/0027215 A1 | 1/2016 | Burns et al. |
| 2016/0093108 A1 | 3/2016 | Mao et al. |

| | | | |
|---|---|---|---|
| 2016/0212272 A1 | 7/2016 | Srinivasan et al. |
| 2016/0253844 A1 | 9/2016 | Petrovskaya et al. |
| 2016/0300387 A1 | 10/2016 | Ziman |
| 2016/0321946 A1 | 11/2016 | Kim |
| 2017/0053422 A1 | 2/2017 | Chojnowski et al. |
| 2017/0161948 A1 | 6/2017 | Hua et al. |
| 2017/0287218 A1 | 10/2017 | Nuernberger et al. |
| 2017/0323482 A1 | 11/2017 | Coup et al. |
| 2017/0345089 A1 | 11/2017 | Wu et al. |
| 2018/0033208 A1 | 2/2018 | Martin |
| 2018/0095616 A1 | 4/2018 | Valdivia et al. |
| 2018/0096519 A1 | 4/2018 | Tokubo |
| 2018/0114353 A1 | 4/2018 | Champion et al. |
| 2018/0122043 A1 | 5/2018 | Energin et al. |
| 2018/0123813 A1 | 5/2018 | Milevski et al. |
| 2018/0144458 A1 | 5/2018 | Xu et al. |
| 2018/0144547 A1 | 5/2018 | Shakib et al. |
| 2018/0173404 A1 | 6/2018 | Smith |
| 2018/0174367 A1 | 6/2018 | Marom et al. |
| 2018/0225885 A1 | 8/2018 | Dishno |
| 2018/0247446 A1 | 8/2018 | Litvin |
| 2018/0307303 A1 | 10/2018 | Powderly et al. |
| 2019/0043269 A1 | 2/2019 | Lin et al. |
| 2019/0197599 A1 | 6/2019 | Zia et al. |
| 2019/0197768 A1 | 6/2019 | Taylor et al. |
| 2019/0279428 A1* | 9/2019 | Mack ........................ G06T 7/90 |
| 2019/0311488 A1 | 10/2019 | Sareen |
| 2019/0311548 A1 | 10/2019 | Wang et al. |
| 2019/0313059 A1 | 10/2019 | Agarawala et al. |
| 2019/0325644 A1 | 10/2019 | Bleyer et al. |
| 2019/0362312 A1 | 11/2019 | Platt et al. |
| 2019/0392643 A1 | 12/2019 | Busto et al. |
| 2020/0027194 A1 | 1/2020 | Nourai et al. |
| 2020/0051336 A1 | 2/2020 | Ichikawa et al. |
| 2020/0051338 A1 | 2/2020 | Zia et al. |
| 2020/0066046 A1 | 2/2020 | Stahl et al. |
| 2020/0226820 A1 | 7/2020 | Stachniak et al. |
| 2020/0368616 A1 | 11/2020 | Delamont |
| 2021/0110560 A1 | 4/2021 | Knorr et al. |
| 2021/0118239 A1 | 4/2021 | Santesteban et al. |
| 2021/0125414 A1 | 4/2021 | Berkebile |
| 2021/0134000 A1 | 5/2021 | Malisiewicz et al. |
| 2021/0233303 A1 | 7/2021 | Takahashi |
| 2021/0241480 A1 | 8/2021 | Yan et al. |
| 2022/0327783 A1 | 10/2022 | El-Ghoroury |
| 2022/0413433 A1 | 12/2022 | Parra Pozo et al. |
| 2023/0196599 A1 | 6/2023 | Tao et al. |
| 2023/0236545 A1 | 7/2023 | Yu et al. |
| 2023/0298280 A1 | 9/2023 | Jouet et al. |
| 2023/0350344 A1 | 11/2023 | Wen et al. |
| 2024/0046590 A1 | 2/2024 | Booth et al. |
| 2024/0062472 A1 | 2/2024 | Herling et al. |
| 2024/0119680 A1* | 4/2024 | Gunnarsson .......... G06F 3/0346 |
| 2024/0119690 A1 | 4/2024 | Ocampo et al. |
| 2024/0219732 A1 | 7/2024 | Miyairi et al. |
| 2024/0249489 A1 | 7/2024 | Olivier et al. |
| 2024/0320917 A1 | 9/2024 | Saito et al. |
| 2024/0371112 A1 | 11/2024 | Rao et al. |
| 2025/0037385 A1 | 1/2025 | Herling et al. |
| 2025/0069334 A1* | 2/2025 | Nguyen ............... G06F 3/0304 |

FOREIGN PATENT DOCUMENTS

| | | |
|---|---|---|
| CN | 106951882 B | 3/2021 |
| EP | 3945486 A1 | 2/2022 |
| WO | 2022017779 A2 | 1/2022 |

OTHER PUBLICATIONS

International Search Report and Written Opinion for International Application No. PCT/US2019/017947, mailed Nov. 28, 2019, 17 Pages.
Irawati; et al., "Spatial Ontology for Semantic Integration in 3D Multimodal Interaction Framework," VRCIA, Hong Kong, ACM, Jun. 14-17, 2006, p. 129-135.
Office Action mailed Jun. 28, 2024 for Chinese Application No. 201910105998.4, filed Jan. 18, 2019, 6 pages.

(56) References Cited

OTHER PUBLICATIONS

International Search Report and Written Opinion for International Application No. PCT/US2024/036987, mailed Oct. 9, 2024, 13 pages.

Coury N.L., "Consumer Perceptions of Apparel Fit Satisfaction and Sizing Based upon 3D Body Scanning and Block Garment Assessment," University of Arkansas ProQuest Dissertations & Theses, May 2015, 62 Pages.

Hawkes R., et al., "Update Rates and Fidelity in Virtual Environments," Virtual Reality, 1995, vol. 1, No. 2, pp. 99-108, Retrieved from the Internet URL: https://link.springer.com/article/10.1007/BF02009726.

Non-Final Office Action mailed Apr. 28, 2025 for U.S. Appl. No. 18/313,185, filed May 5, 2023, 14 pages.

Popovic M., et al., "Grasping Unknown Objects Using an Early Cognitive Vision System for General Scene Understanding," IEEE-RSJ International Conference on Intelligent Robots and Systems, 2011, 8 Pages.

International Preliminary Report on Patentability for International Application No. PCT/US2024/036987, mailed Mar. 5, 2026, 10 pages.

\* cited by examiner

400

410

412
processing units 414
working memory

416
I/O 418
storage memory 420
mediator

430

432
interfaces 434
initial room capture 436
room capture realignment 438
miniturized 3D model generator

ARTIFICIAL REALITY ROOM CAPTURE REALIGNMENT

TECHNICAL FIELD

The present disclosure is directed to artificial reality and capturing a real world room and scene for use in artificial reality.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Some types of artificial reality incorporate real world elements, such as real world rooms and spaces, by digitally reconstructing or capturing those elements as a three dimensional space or an artificial reality space. In addition to capturing the elements, it is necessary to align the artificial reality space to the corresponding real world space so that the location where a user is viewing in the artificial reality space is approximately the same location in the real world space.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
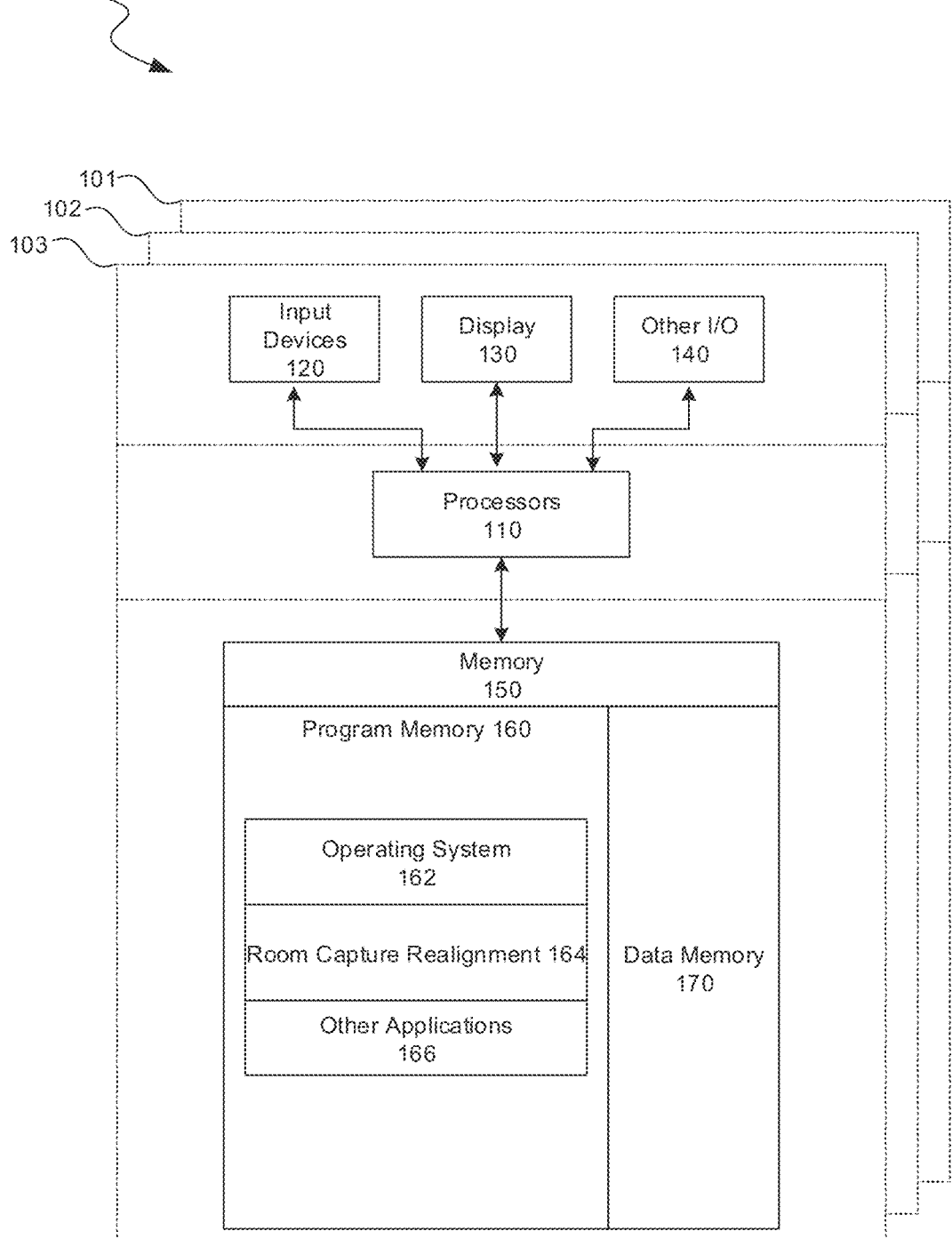
FIG. 1 is a block diagram illustrating an overview of devices on which some implementations of the present technology can operate.

Aspects of the present disclosure are directed to recapturing or realigning a room or scene or space that has previously been digitally captured as an artificial reality room or scene (i.e., the digital reconstruction of a real world physical room, scene or space) without the need to progress through the entire original room capturing workflow. Realignment may be necessary due to, for example, sensor drift such as when the positional tracking of the headset and controllers by sensors becomes inaccurate.

Example implementations are directed to recapturing or realigning a room or scene in an artificial reality (XR) environment as a three dimensional (3D) space. To initially capture a room, a user manually annotates, using an XR system, one or more walls around the XR system. The XR system then aligns or localizes itself relative to the room. Once a room is captured and stored, and the user in the future enters the room again, the XR system may not be able to align itself in the room due to, for example, lighting conditions. Rather than require the user to manually recapture every wall captured during the initial room capture, the XR system can select one wall for recapture and, after receiving an annotation or marking of the one wall from the user, use the selection to realign the XR system relative to the room.

In some implementations, the XR system projects a hand-tethered miniaturized "ghosted" 3D model of the room that highlights one of the walls in the room, and the user annotates the highlighted wall, thus enabling the XR system to realign itself relative to the room. Example implementations further include multiple room support where the user has manually captured multiple rooms, and the XR system can pick a previously saved room when the room is not automatically recognized. Example implementations also further include room capture and recapture using one or more objects or furniture in the room instead of a wall.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Example implementations provide a technical solution in realigning a previously captured real world room or scene by implementing a "key" wall, where all other walls and objects in the room are mapped to the key wall. A hand tethered miniaturized 3D model of the room can be created and used to show the user, within the corresponding XR room, which is the key wall that needs to be marked or highlighted or annotated. After the key wall is marked, the XR room can be automatically realigned with the real world room. Therefore, example implementations avoid a generally complex workflow that is typically used for the initial real world word capture.

Several implementations are discussed below in more detail in reference to the figures. FIG. 1 is a block diagram illustrating an overview of devices on which some implementations of the disclosed technology can operate. The devices can comprise hardware components of a computing system 100 that provides room capture realignment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor (s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, room capture realignment 164, and other application programs 166. Memory 150 can also include data memory 170 that can include, e.g., one or more previously captured rooms or spaces data, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
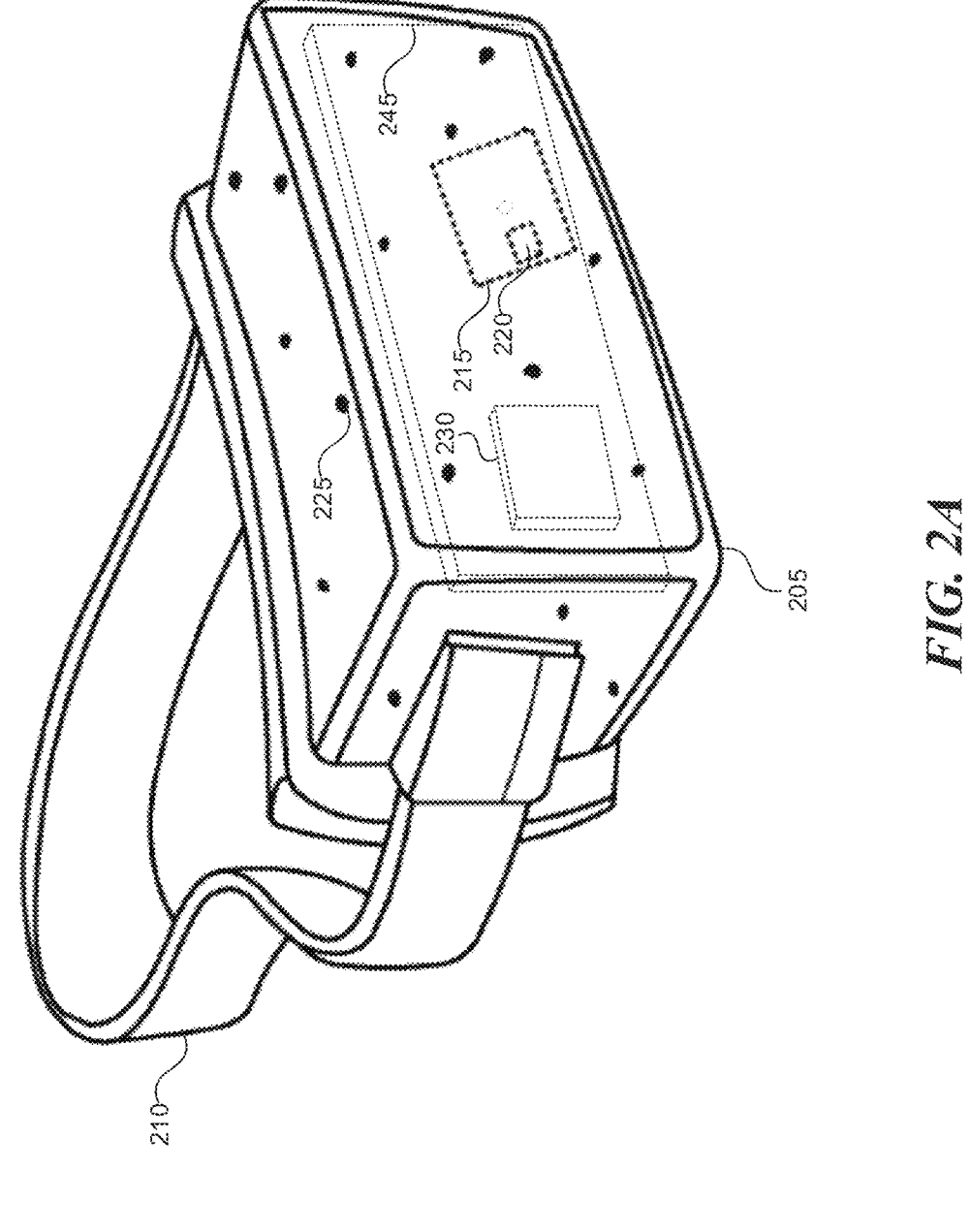
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in an artificial reality environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
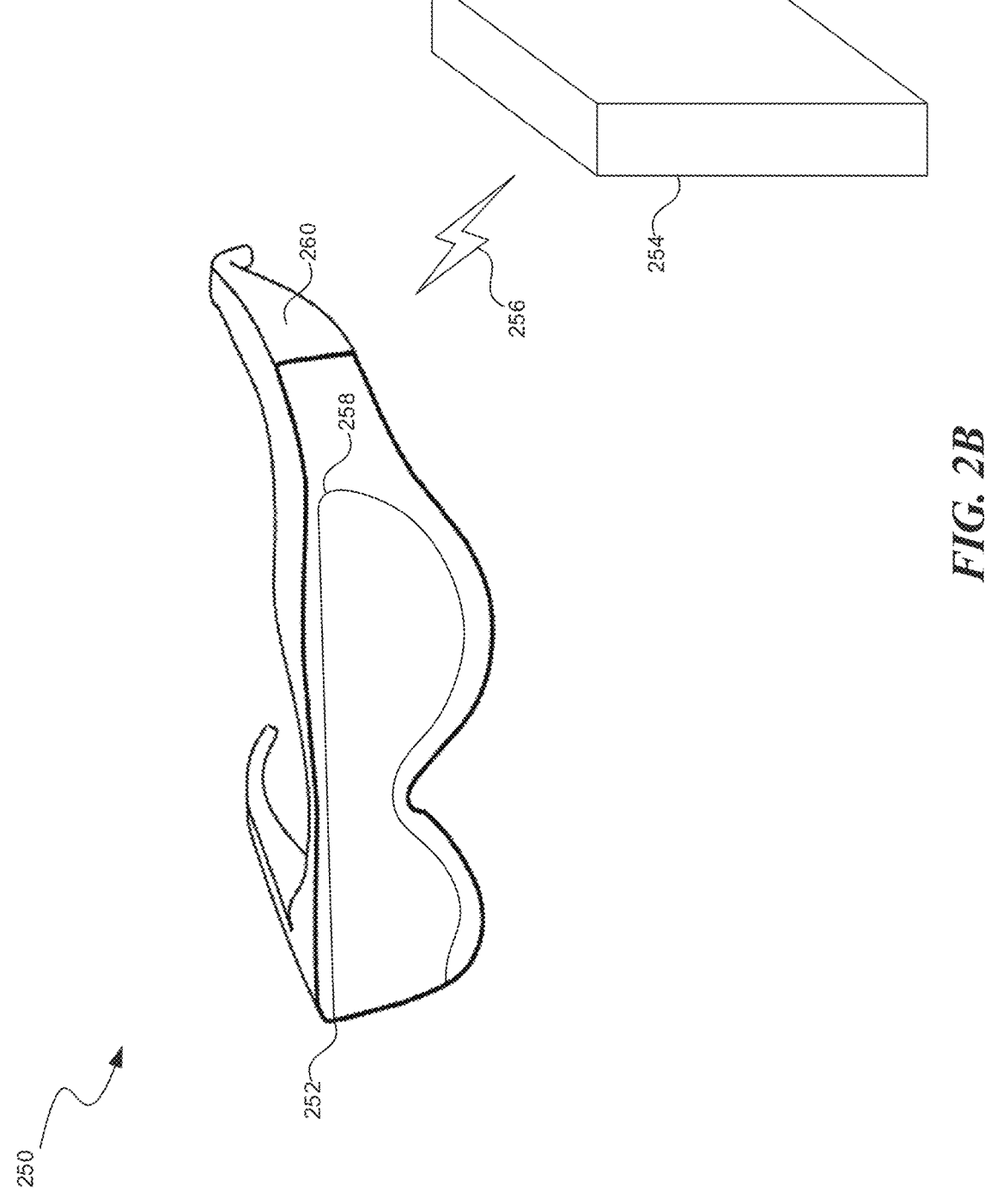
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
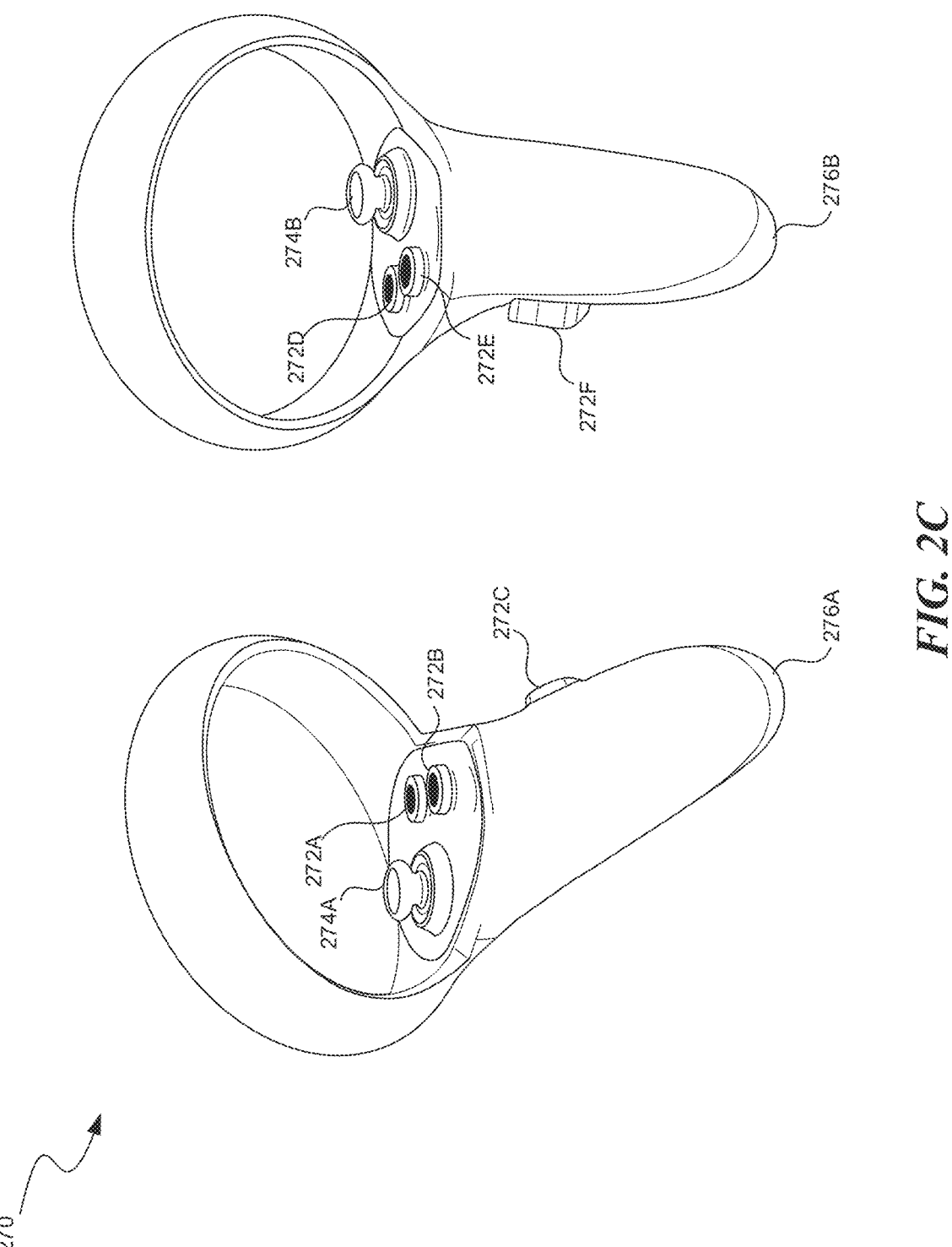
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
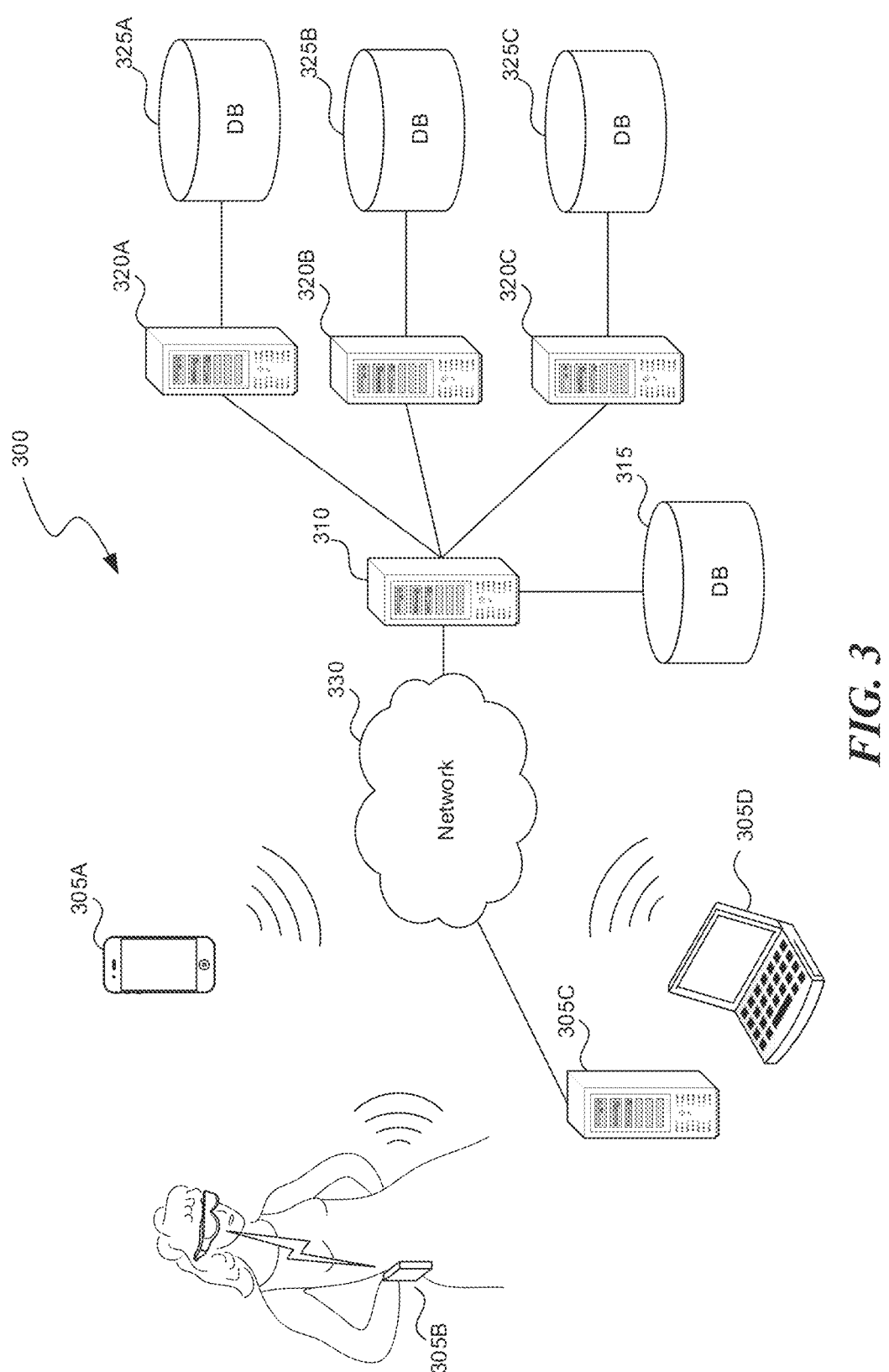
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

Figure 4:
FIG. 4 is a block diagram illustrating components which, in some implementations, can be used in a system employing the disclosed technology.
Figure 4:
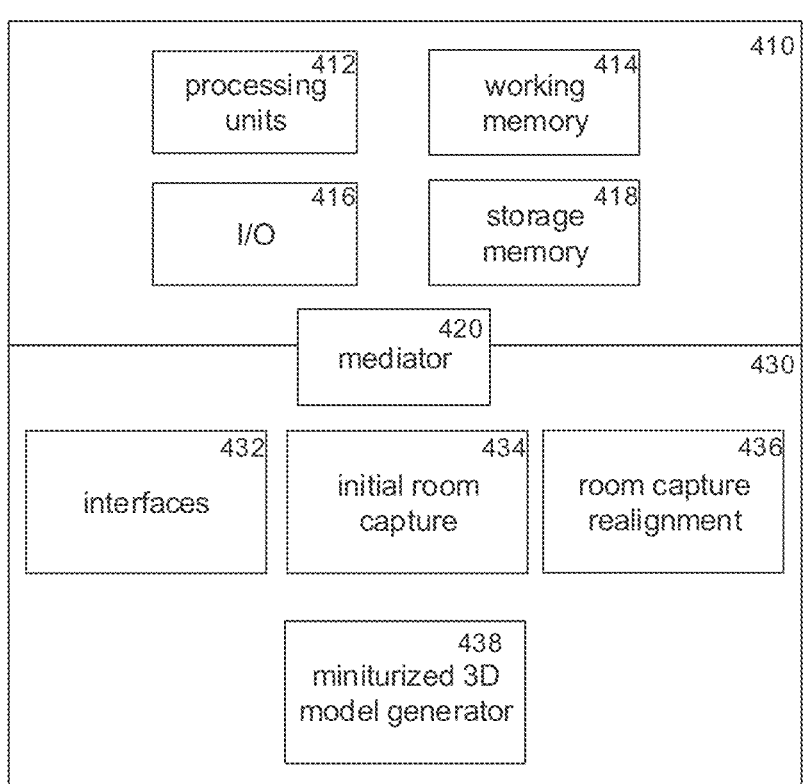

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for XR room capture realignment. Specialized components 430 can include initial room capture 434, room capture realignment 436, miniaturized 3D model generator 438, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. Although depicted as separate components, specialized components 430 may be logical or other nonphysical differentiations of functions and/or may be submodules or code-blocks of one or more applications.

Initial room capture 434 provides functionality for a real world room to be captured so that it can be utilized in an XR system as a 3D visualization or model of the real world room. Initial room capture 434 can be a system-guided flow that guides a user to walk around and capture the room architecture and furniture to generate a room model. The flow can involve having the user mark out walls, doors, windows, couches, desks and furniture using controllers 270. Additional details on initial room capture 434 are provided below with reference to block 1202 of FIG. 12.

Room capture realignment 436 provides functionality to realign a previously captured room generated by initial room capture 434. Room capture realignment 436 allows a single wall or other object to be marked to establish the realignment rather than requiring an entirely new initial room capture. Additional details on room capture realignment 438 are provided below with reference to blocks 1204-1206 of FIG. 12.

Miniaturized 3D model generator 438 generates a miniaturized "ghosted" 3D model that is tethered to one of the controllers to assist in the room capture realignment 438. The tethered miniaturized 3D model can be shifted from one XR controller to the other XR controller in response to controller input. Additional details on miniaturized 3D model generator 438 are provided below with reference to block 1204 of FIG. 12.

FIGS. 5-11 are screenshots that illustrate a sequence of realigning a room capture within an XR environment in example implementations. The view of the room shown in FIGS. 5-11 within the HMD is referred to as the "XR room" and corresponds to the actual real world room that the user has entered and is generated as a 3D model. The XR room is generated and displayed in one implementation using a mixed reality headset, such as HMD 250, where the XR room is displayed via the pass-through display 258 and then the actual images of the room can be added to or annotated. In other implementations, a headset such as HMD 200 may be used, where the XR room is reproduced via cameras.

Figure 5:
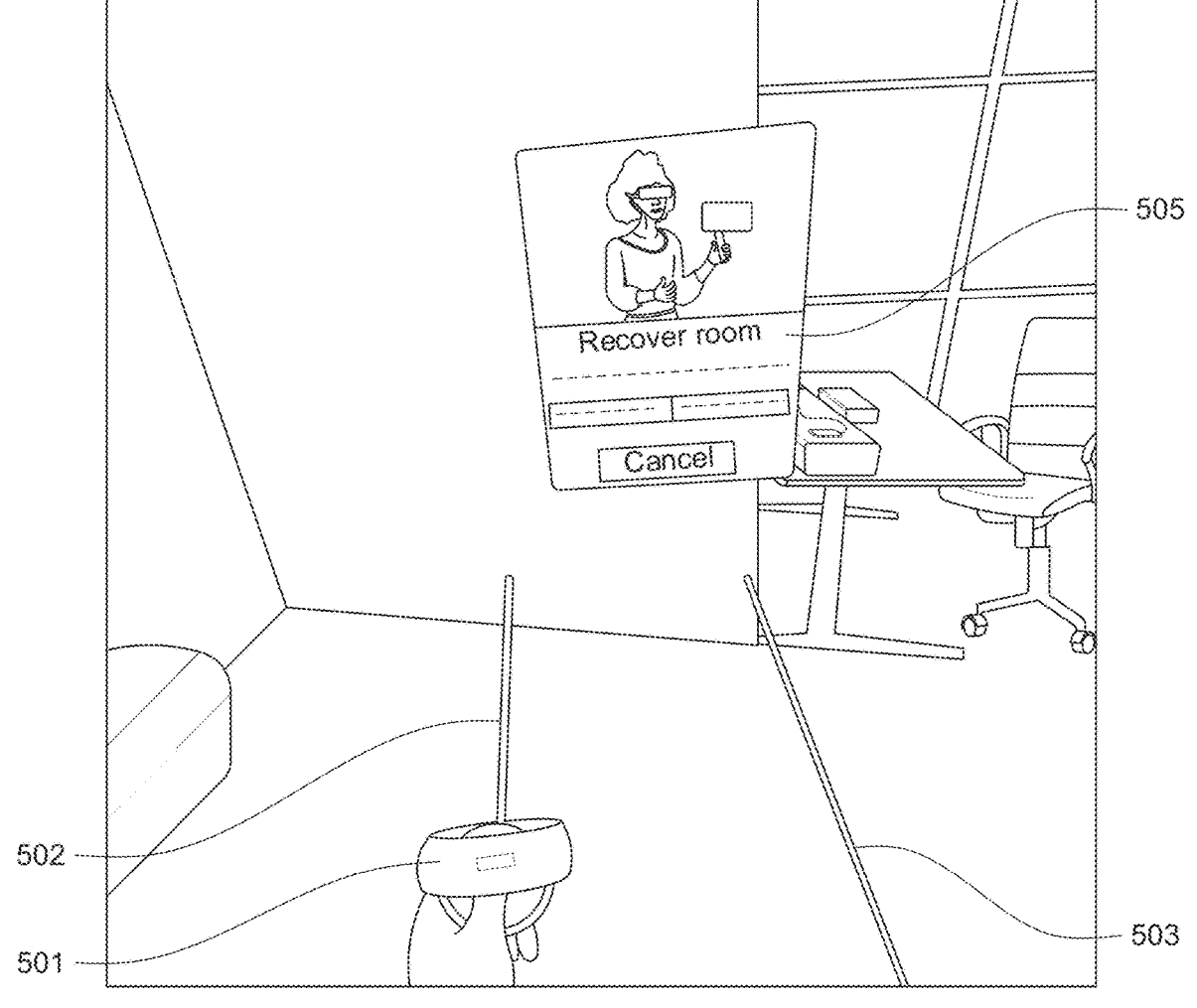
FIG. 5 illustrates when a user initially re-enters a previously captured room in example implementations.

FIG. 5 illustrates when a user initially re-enters a previously captured room in example implementations. The XR system attempts to localize its position to determine if it has entered an already-captured room. As described, the XR system, via cameras, may not be able to recognize the room due to, for example, lighting conditions that have changed since the room was previously captured. If the room is not recognized, the user may be presented with an option to pick from one or more previously saved rooms (i.e., rooms that were previously captured) if a previously saved room is not automatically recognized or map a new room that has not been previously captured.

In example implementations, the user, within the HMD, will see avatars representing each of the controllers (e.g., avatar 511, where the $2^{nd}$ avatar is not shown in FIG. 5), with each avatar showing a ray casting ray 502, 503, that is used for selecting virtual objects. Other selecting implementations can be used, including a "pure hands" avatar that allows an index finger of the hand to be used for selections. A "Recover Room" menu 505 is presented that can be selected when room recovery/realignment is desired. The XR system may determine that the room needs to be realigned automatically, such as when lighting conditions from the camera determines realignment is needed, or from manual input by the user.

Figure 6:
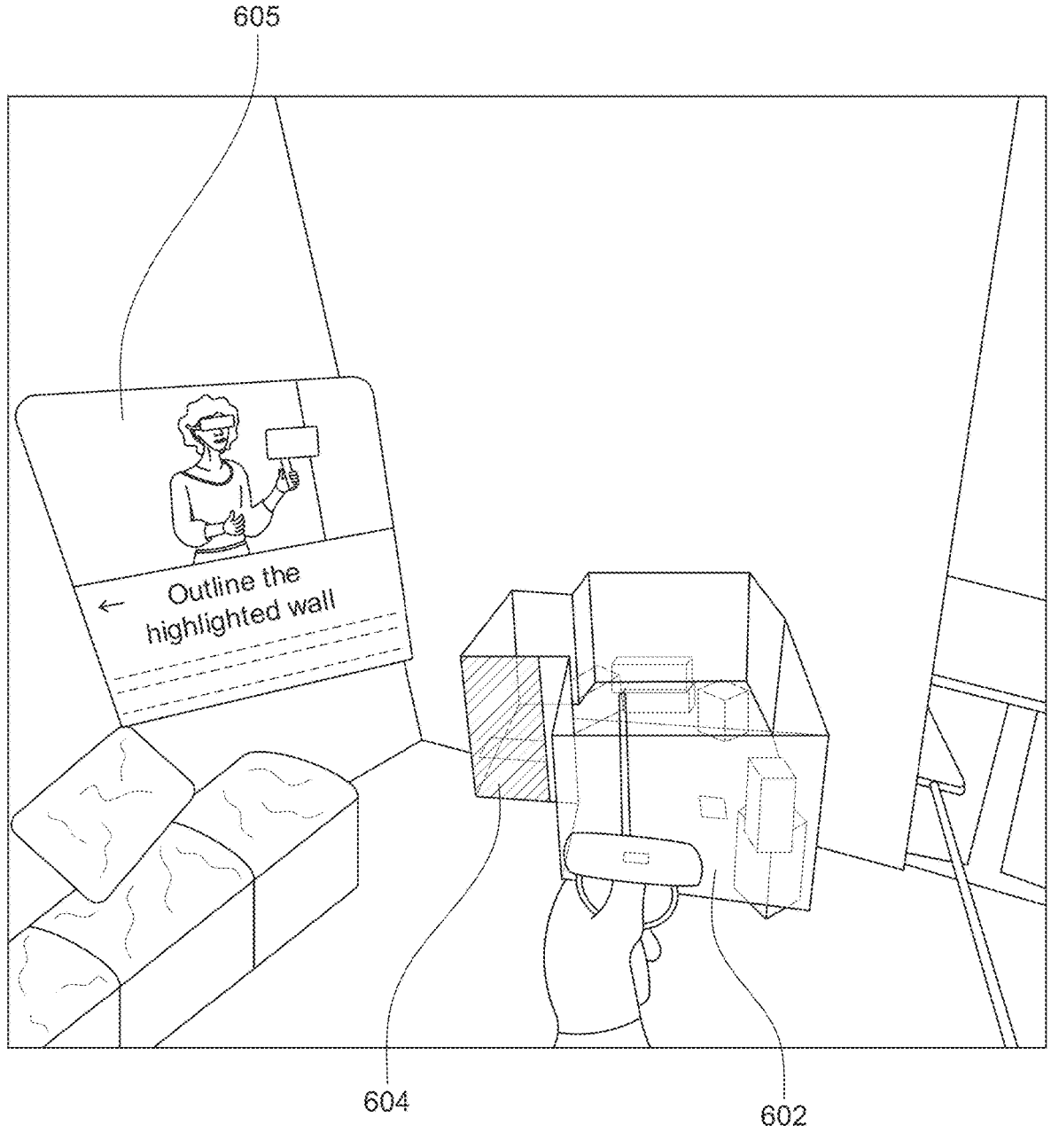
FIG. 6 illustrates an example implementation of a workflow that instructs a user to how to realign a previously captured room.

FIG. 6 illustrates an example implementation of a workflow that instructs a user to how to realign a previously captured room. A miniaturized 3D model 602 of the room is generated and tethered to one of the controllers. One of the walls of the room, which is the "key" wall 604, is highlighted, and the user is instructed in menu 605 to outline the highlighted wall in the room. Wall 604 is considered the key wall because all objects in the room were mapped to that wall as a result of the initial room capture.

In other example implementations, any other means for indicating to the user the identity of the "key" wall can be used, including textual directions, a two dimensional map, etc.

Figure 7:
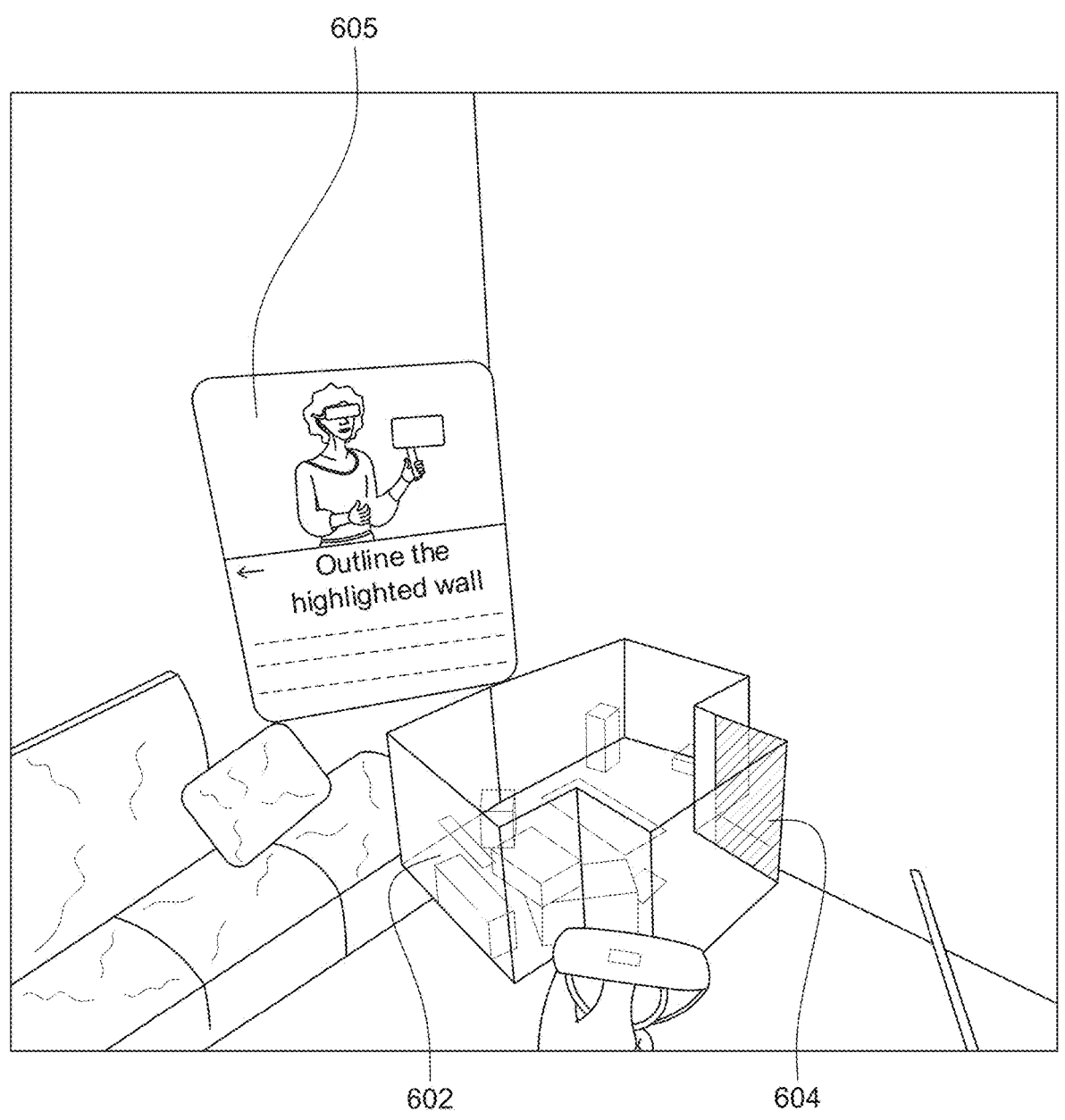
FIG. 7 illustrates that, as the user moves the controllers to move to the highlighted wall, the room rotates to attempt to correspond the room with the actual room in example implementations.

FIG. 7 illustrates that, as the user moves the controllers in order to move to the highlighted wall 604, the miniaturized room 602 rotates to attempt to correspond room 602 with the actual room in example implementations. In some implementations, room 602 rotates automatically, and in some implementations room 602 rotates in response to user input on the controller when the XR system cannot determine the correct rotation due to the need for realignment.

Figure 8:
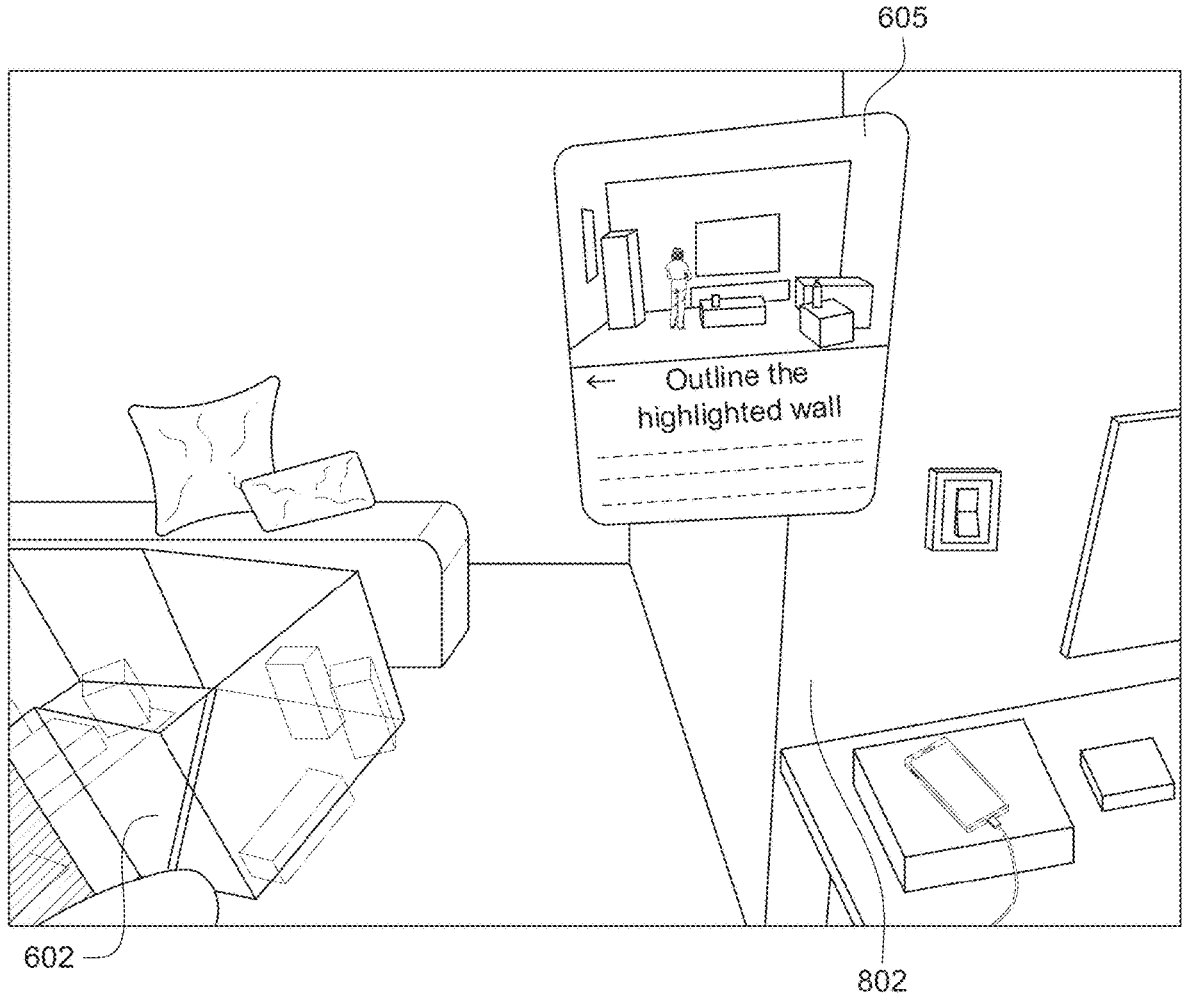
FIG. 8 illustrates the wall that corresponds to the highlighted wall when in view of the user that corresponds to the highlighted wall in example implementations.

FIG. 8 illustrates the wall 802 that corresponds to highlighted wall 604 when in view of the user that corresponds to the highlighted wall 604 in example implementations.

Figure 9:
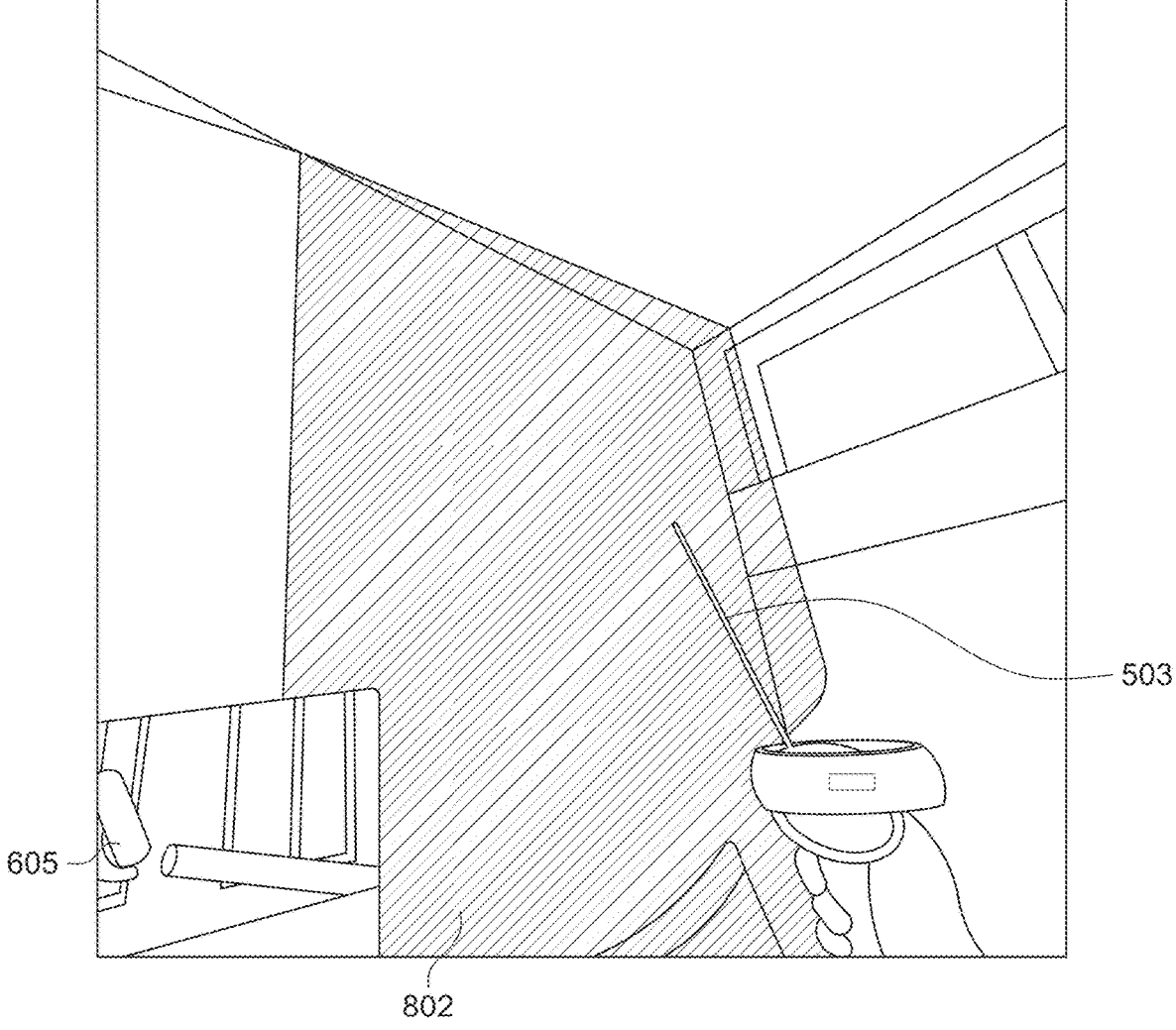
FIG. 9 illustrates the process to outline or mark or annotate the actual wall in accordance with example implementations.

FIG. 9 illustrates the process to outline or mark or annotate the actual wall 802 in accordance with example implementations. In example implementations, the ray 503 corresponding to the controller that is not tethered to the 3D model is used to outline the wall. In one example, first the height of the wall is captured by moving the ray from top to bottom, edge to edge (or vice versa), and then the width by moving the ray from left to right (or vice versa). In example implementations, before annotating the actual wall, the user will need to first calibrate by placing the controller on the floor and clicking one of the buttons in order to confirm the floor level.

In example implementations, cameras within the HMD that execute plane detection algorithms can be used to capture the highlighted real world wall for virtual reality. These cameras use computer vision techniques to detect and analyze planes, which are flat surfaces like walls and floors, in real-time. Each camera can be a depth-sensing camera that can capture 3D data of a room in real-time using a technique called SLAM (Simultaneous Localization and Mapping). The camera can detect planes and create a 3D map of the environment by tracking its own movement and combining it with the depth data captured by the camera.

Figure 10:
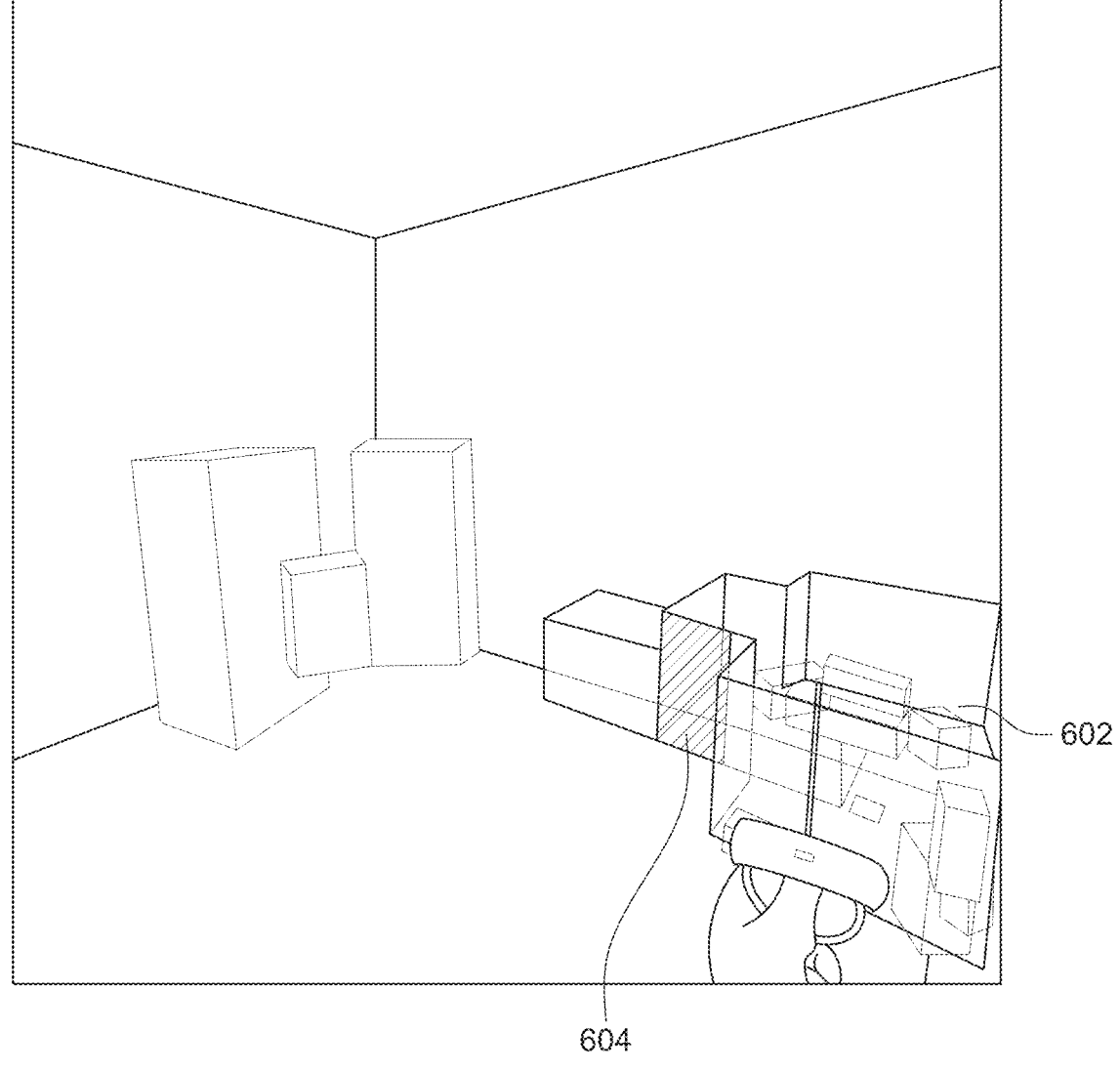
FIG. 10 illustrates that, after the wall is successfully marked or captured, the remaining walls and objects in the room are outlined in accordance with example implementations.

FIG. 10 illustrates that after wall 802 is successfully marked or captured, the remaining walls and objects in the room are outlined in accordance with example implementations.

The XR room and the real world room can then be automatically realigned. In one example implementation, SLAM-based tracking is used for the realignment, which involves using a depth-sensing camera or other sensors to create a 3D map of the real-world room and track the position and orientation of the camera in real-time. The data from the sensors are then used to realign the virtual room with the real-world room. In another example implementation, inertial-based tracking is used for the realignment, which involves using IMUs or other sensors to track the position and orientation of the user's head or body in real-time. The data from the sensors are then used and calibrated to update the position and orientation of the virtual room to match the real-world room.

Figure 11:
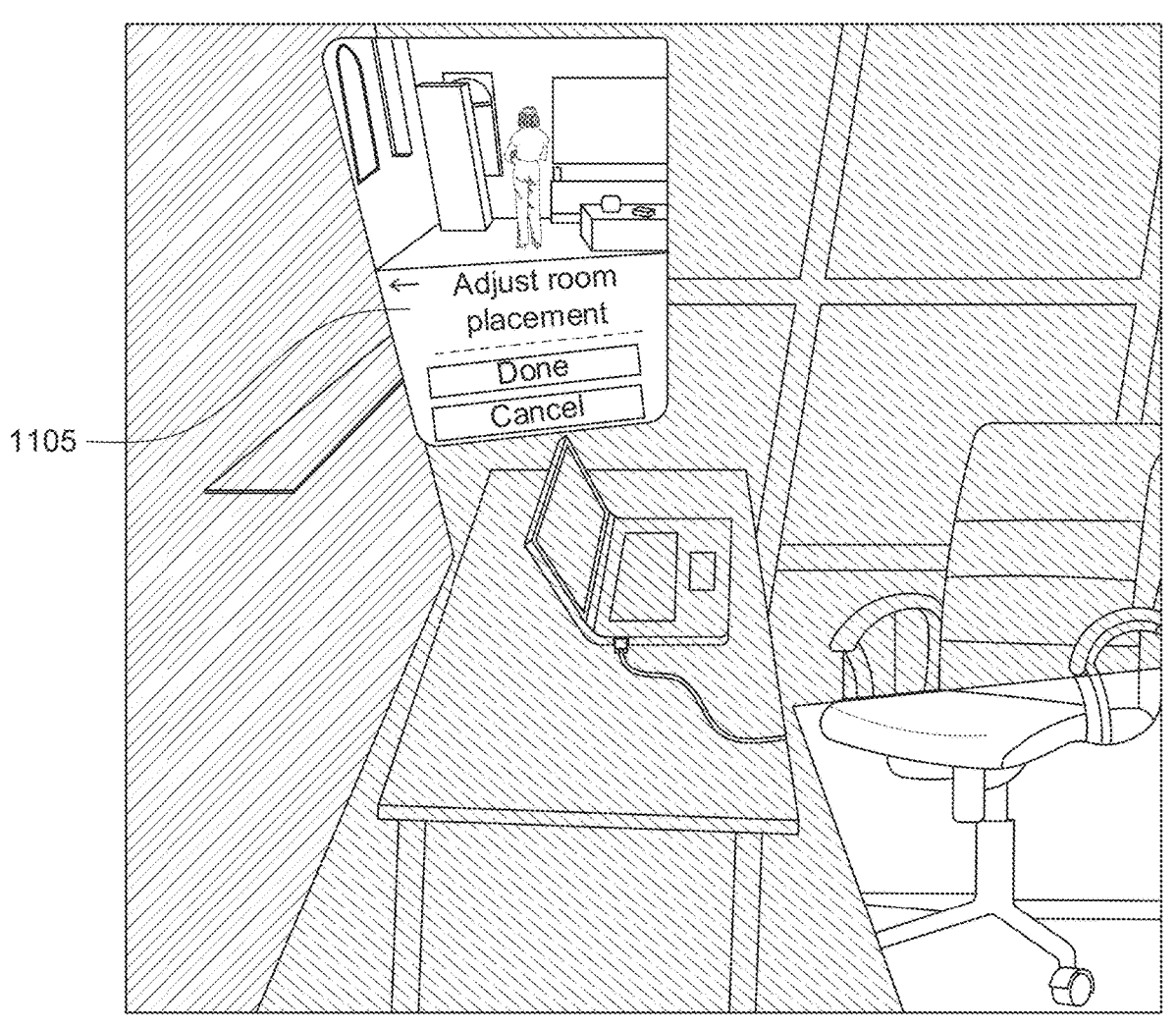
FIG. 11 illustrates an adjust room placement functionality that is entered after the key wall is successfully marked in accordance with example implementations.

FIG. 11 illustrates an adjust room placement functionality that is entered after the key wall is successfully marked in accordance with example implementations if an automatic re-alignment is not adequate. The user is instructed by menu 1105 to move the controllers to shift the placement of the whole XR room until it is aligned with the outlined walls and objects. At that point, the entire room has been successfully realigned The user can drag the XR room, using one or more controllers, in free space which moves it around translationally or rotationally.

Those skilled in the art will appreciate that the components illustrated in FIGS. 1-11 described above, and in the flow diagram discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 12:
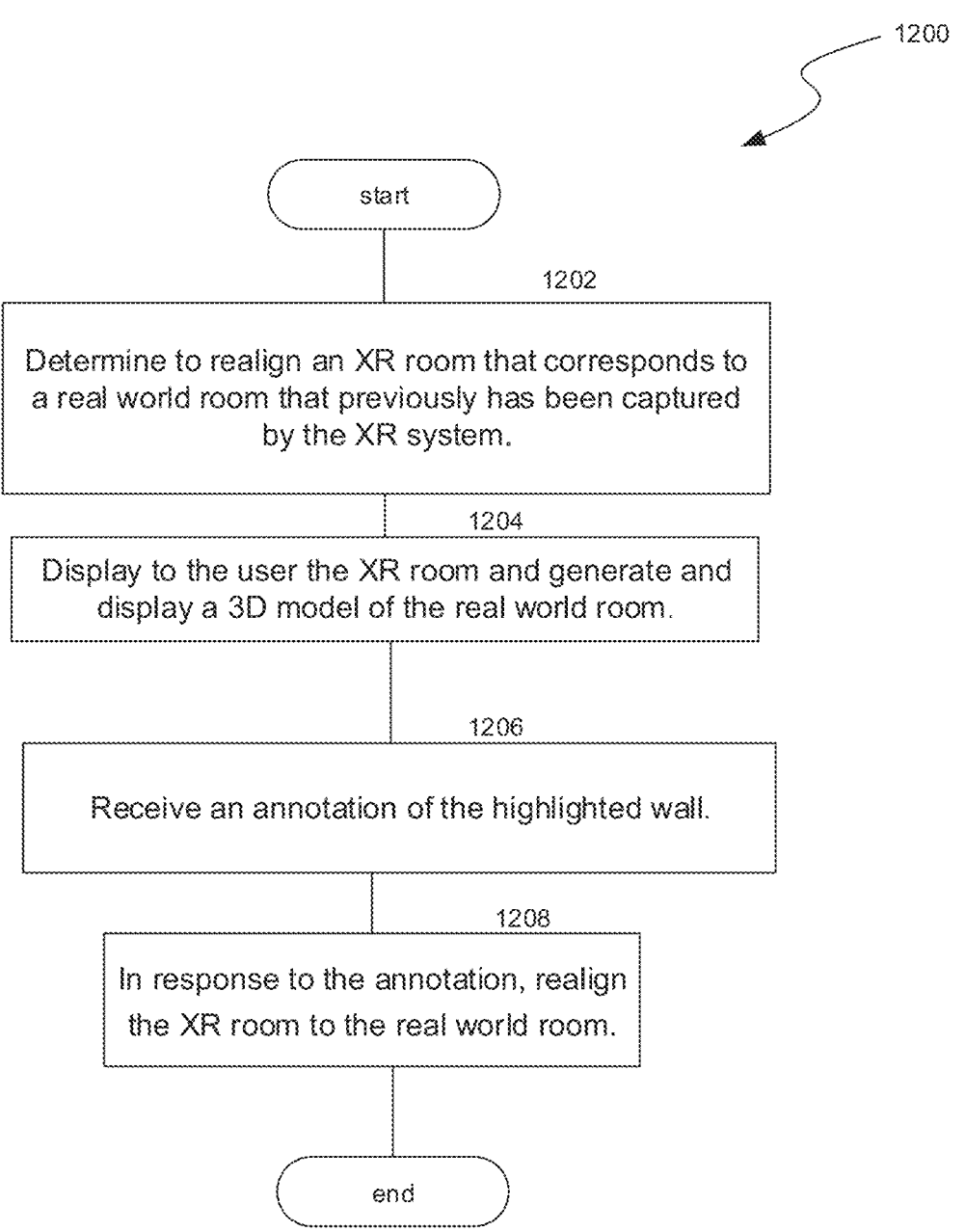
FIG. 12 is a flow diagram illustrating a process used in some implementations for realigning a captured room.

FIG. 12 is a flow diagram illustrating a process 1200 used in some implementations for realigning a captured room. In some implementations, process 1200 can be performed in a response to a user entering a room that is recognized as previously being captured by the XR system. A room can be recognized if at least a portion of room corresponds to a stored room map but not necessarily the entire stored room map. The amount of correspondence between the room and the stored room map may need to exceed a predefine threshold before the room can be recognized. In some implementations, process 1200 can be performed in response to a user requesting that a room be recaptured. In some implementations, process 1200 can be performed on an XR device or on a remote system supporting such an XR device.

At block 1202, process 1200 determines to realign an XR room that corresponds to a real world room that previously has been captured by the XR system. The determining can be in response to a user requesting a realignment, or an automatic determination that a realignment is necessary. The determination can be received in response to a user entering a room that is recognized by the XR system as a room previously captured by the XR system but needs to be realigned. If the XR system does not automatically recognize the room because, for example, the lighting has been changed from when the room was previously captured, the user can be prompted to select the room. The selection can be from multiple rooms that previously have been captured and saved, or if only one room has been previously captured and saved, the selection can be a confirmation that the previously captured room is the same room.

At block 1204, process 1200 displays to the user the XR room and generates and displays a 3D model 602 of the real world room. The 3D model 602 includes a highlighted wall 604 corresponding to the key wall of the captured room. The XR room can be a mixed reality version of the actual room, or a completely reproduced view of the actual room.

The key wall is one of the walls to which all other wall and objects are mapped to during the initial room capture process. The key wall may be the first wall that is annotated during the room capture process, or the key wall may be specifically selected during the capture process. For example, the key wall may be selected as the longest or widest wall in the room for enhanced mapping accuracy or can be the wall in closest proximity to the HMD, determined through the use of external tracking cameras, SLAM system calculations for depth perception, etc. In other example implementations, the room may be an open room with zero or only one wall. In this example, instead of a key wall, a key object (e.g., a desk or other furniture) can be used, and that key object will be highlighted in the 3D model 602 instead of a wall. All other objects will be mapped to the key object in this implementation.

At block 1206, process 1200 receives an annotation (also referred to as a marking, a highlighting, a scanning, etc.) of the highlighted wall. In response to the annotation, other walls of the room and objects in the room can be highlighted by outlines or other means At block 1208, process 1200, in response to the annotation, realigns the XR room to the real world room. The alignment can be automatic, or can also be assisted by the user by moving the controllers around the room to align the XR room, including the objects with the real world room.

In another example implementation, instead of the above process, one or both controllers can be set down at a specific location, and the room can be automatically recalibrated around the controller(s).

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for realignment of an artificial reality (XR) captured room for an XR system comprising one or more XR controllers, the method comprising:

determining to realign an XR room corresponding to a real world room that previously has been captured by the XR system, the real world room comprising one or more real walls and the XR room comprising one or more XR walls that correspond to the one or more real walls;

displaying, to a user, the XR room and identifying a first wall of the one or more XR walls;

receiving, via at least one of the XR controllers, an annotation of the first wall indicating an alignment correction; and realigning, using the alignment correction from the annotation, the XR room to the real world room.

2. The method of claim 1, wherein the identifying the first wall comprises generating and displaying a miniaturized three-dimensional model of the XR room that comprises a highlighted wall corresponding to the first wall.

3. The method of claim 2, wherein the first wall is a key wall and the remaining one or more XR walls are mapped to the key wall.

4. The method of claim 3, wherein the real world room comprises one or more real objects, and the XR room comprises one or more virtual XR objects that correspond to the one or more real objects, wherein the XR objects are mapped to the key wall.

5. The method claim 3, wherein the key wall is an initial wall that was captured when the real world room was previously captured or is a widest wall of the real world room.

6. The method of claim 2, wherein the miniaturized three-dimensional model rotates to correspond to an orientation of a first XR controller and a second XR controller relative to the XR room.

7. The method of claim 6, wherein the annotation of the first wall is received and implemented by the second XR controller.

8. The method of claim 1, wherein the annotation comprises scanning a height and a width of the first wall using a second XR controller.

9. The method of claim 8, wherein the scanning comprises casting a ray that extends from the second controller.

10. The method of claim 1, further comprising:

in response to the user entering the real world room, displaying a selectable list of previously captured real world rooms and receiving a selection of one previously captured real world rooms for the realignment.

11. The method of claim 1, wherein the determining is in response to the user requesting the realignment.

12. The method of claim 1, wherein the determining is in response to an automated determination that the XR room needs to be realigned with the real room based on at least lighting conditions of the real world room.

13. The method of claim 1, further comprising placing a second XR controller on a floor of the real world room to establish a floor level.

14. A non-transitory computer-readable storage medium storing instructions that, when executed by a computing system, cause the computing system to perform a process for realignment of an artificial reality (XR) captured room for an XR system, the process comprising:

determining to realign an XR room corresponding to a real world room that previously has been captured by the XR system, the real world room comprising one or more real walls and the XR room comprising one or more XR walls that correspond to the one or more real walls;

displaying, to a user, the XR room and identifying a first wall of the one or more XR walls;

receiving an annotation of the first wall indicating an alignment correction; and realigning, using the alignment correction from the annotation, the XR room to the real world room.

15. The non-transitory computer-readable storage medium of claim 14, wherein the identifying the first wall comprises generating and displaying a miniaturized three-dimensional model of the XR room that comprises a highlighted wall corresponding to the first wall.

16. The non-transitory computer-readable storage medium of claim 15, wherein the first wall is a key wall and the remaining one or more XR walls are mapped to the key wall.

17. The non-transitory computer-readable storage medium of claim 16, wherein the real world room comprises one or more real objects, and the XR room comprises one or more XR objects that correspond to the one or more real objects, wherein the XR objects are mapped to the key wall.

18. The non-transitory computer-readable storage medium of claim 14, wherein the identifying a first wall of the one or more XR walls comprises scanning a height and a width of the first wall.

19. The non-transitory computer-readable storage medium of claim 14, wherein the process further comprises:

in response to the user entering the real world room, displaying a selectable list of previously captured real world rooms and receiving a selection of one previously captured real world rooms for the realignment.

20. A computing system for realignment of an artificial reality (XR) captured room for an XR system, the computing system comprising:

one or more processors; and one or more memories storing instructions that, when executed by the one or more processors, cause the computing system to perform a process comprising:

determining to realign an XR room corresponding to a real world room that previously has been captured by the XR system, the real world room comprising one or more real walls and the XR room comprising one or more XR walls that correspond to the one or more real walls;

displaying, to a user, the XR room and identifying a first wall of the one or more XR walls;

receiving an annotation of the first wall indicating an alignment correction; and realigning, using the alignment correction from the annotation, the XR room to the real world room.

\* \* \* \* \*